(12) United States Patent
Coriand et al.

(10) Patent No.: US 6,423,656 B1
(45) Date of Patent: *Jul. 23, 2002

(54) SYNTHETIC QUARTZ GLASS PREFORM

(75) Inventors: Frank Coriand; Andreas Menzel; Andreas Voitsch, all of Jena (DE)

(73) Assignee: Schott ML GmbH, Jena (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,490

(22) PCT Filed: Mar. 6, 1998

(86) PCT No.: PCT/EP98/01311

§ 371 (c)(1),
(2), (4) Date: Sep. 15, 1999

(87) PCT Pub. No.: WO98/40319

PCT Pub. Date: Sep. 17, 1998

(30) Foreign Application Priority Data

Mar. 7, 1997 (DE) .......................... 197 09 379

(51) Int. Cl.[7] ................................ C03C 9/00
(52) U.S. Cl. .......................................... 501/54
(58) Field of Search ..................... 501/53, 54

(56) References Cited

U.S. PATENT DOCUMENTS

| 5,086,352 | A | * | 2/1992 | Yamagata et al. | .......... | 359/350 |
|---|---|---|---|---|---|---|
| 5,352,230 | A | * | 6/1994 | Yamagata et al. | .......... | 359/350 |
| 5,410,428 | A | * | 4/1995 | Yamagata et al. | .......... | 359/350 |
| 5,707,908 | A | * | 1/1998 | Komine et al. | ............... | 501/53 |
| 5,958,809 | A | * | 9/1999 | Fujiwara et al. | .............. | 501/54 |
| 6,087,283 | A | * | 7/2000 | Jinbo et al. | ................... | 501/54 |

FOREIGN PATENT DOCUMENTS

| DE | 4203287 | | 8/1993 |
|---|---|---|---|
| EP | 0401845 | | 12/1990 |
| EP | 0483752 | | 5/1992 |
| EP | 0622340 | | 11/1994 |
| EP | 0673888 | | 9/1995 |
| EP | 0720970 | | 7/1996 |
| EP | 0735006 | | 10/1996 |
| EP | 0780345 | | 6/1997 |
| JP | 63123831 | | 5/1988 |
| JP | 01257146 | | 10/1989 |
| JP | 07138028 | | 5/1995 |
| JP | 08040736 | * | 2/1996 |
| JP | 410067526 | * | 3/1998 |

* cited by examiner

Primary Examiner—Karl Group
(74) Attorney, Agent, or Firm—Jordan and Hamburg LLP

(57) ABSTRACT

The invention relates to a synthetic quartz glass preform which is produced according to the flame hydrolysis technique with subsequent cooling and is suitable for the application of high-energy DUV radiation in the wave length range under 250 nm. Said preform has a core area which contains $\geq 1150$ ppm OH, a strain double refraction of $\leq 5$ nm/cm and a resistance to high-energy DUV radiation as a result of a transmission reduction of $\Delta T \leq 0.1$ %/cm thickness. The quartz glass has been exposed to the following radiation: wavelength $\lambda_1 = 248$ nm, laser shot frequency $\geq 300$ Hz, laser shot value $\geq 10^9$ and rumination $\leq 10$ mJ/cm$^2$, and wavelength $\lambda_2 = 193$ nm, laser shot frequency $\geq 300$ Hz, laser shot value $\geq 10^9$ and rumination $\leq 5$ mJ/cm$^2$. A device for producing said preform comprises a horizontally positioned muffle with two different-sized openings facing each other. The larger of said openings is for removing the preform, the smaller opening being for introducing a burner. The internal chamber of the muffle narrows from the larger opening to the smaller opening.

6 Claims, 2 Drawing Sheets

SYNTHETIC QUARTZ GLASS PREFORM

BACKGROUND OF THE INVENTION

The invention relates to a synthetic quartz glass preform and a device for producing the same.

In accordance with developments in the semiconductor industry, and utilization of the products from the semiconductor industry in various fields of application, as well as due to independent developments, in particular in the special fields of materials management and medicine, light sources with very high energy densities find application. Particularly, these are excimer laser with operation wavelengths of 248 nm and 193 nm. The optical components used thereby for imaging and directing the radiation, as well as the photomasks which exclusively consist of synthetic quartz glass or calcium fluoride have to satisfy the required optical quality and must not lose the same in continuous operation. The most important high-quality features of the optical components arid the most difficult ones to be set, are optical homogeneity and stability with respect to excimer laser irradiation in the deep ultra-violet light (DUV). Therefore, there was no lack of trials in the past to obtain such high-quality features permanently and reproducibly.

Hence, there is known a method for producing a homogeneous, striae free body of quartz glass from DE 42 04 406 A1, in which a rod-shaped initial body is twisted, multiply thermally remodeled in a mould of suitable foreign material and twisted again. In the EP 0 673 888 A1 this method is modified under avoidance of any contact with a foreign material in such a manner that a quartz glass body subsequently produced according to the method is optically homogeneous in three directions and additionally is stable with respect to excimer laser radiation. However, EP 0 673 888 A1 does not teach to which degree this stability is achieved. Additionally, the method is considerably time and cost consuming.

Synthetic quartz glass is characterized by having very good transmission in the deep range of ultra-violet light (DUV). When it is exposed to high energy short-wave radiation as, for example, provided by excimer lasers at 248 nm and 193 nm, photochemical reactions will result, which will lead to the formation of paramagnetic defects, the latter being responsible for the formation of absorption bands and the development of luminescence. The power of these photochemical reactions depends on intrinsic defects in the form of binding anomalies. The photochemical reactions are also intensified by contaminants in a network as given, for example, by atoms of transition metals and chlorine. Parallel to these photochemical reactions which impair the optical properties of the quartz glass, annealing processes take place for which an OH content and a content of free hydrogen in the quartz glass is of importance.

From the subsequently discussed prior art it is known to desensitize synthetic quartz glass to high-energy radiation in the DUV by the following measures, carried out individually or in combination: introducing molecular hydrogen into the quartz glass bulk, using particularly pure starting raw material, using chlorine free starting raw material, and doping the quartz glass with fluorine and others. The EP 0 483 752 A1 ( U.S. Pat. No. 5,410,428) reference relates to a synthetic silica glass with a content of molecular hydrogen of at least $5 \cdot 10^{16}$ molecules/cm$^3$ which is manufactured by a process wherein a quartz glass body is exposed to a hydrogen atmosphere in a furnace at a high temperature and a high pressure for a defined time, until a desired hydrogen concentration has been established in its interior; subsequently the silica glass body is definedly cooled down to ambient temperature. This silica glass is known as being very stable against high-energy radiation in the DUV, although it has only been exposed to $2 \cdot 10^6$ laser shots. It is disadvantageous that an after treatment of the silica glass is necessary including extensive safety measures required thereto. Furthermore, the produced silica glass bodies exhibiting the desired properties may not be of very large volume.

The EP 0 525 984 A1 reference describes a method for producing quartz glass which is adapted to be exposed to an excimer laser irradiation. However, the resistance property of the same is only disclosed up to a laser shot rate of about $10^6$ at an energy density of 200 mJ/cm$^2$, a shot frequency of 100 Hz and a wavelength of $\lambda$=193 nm. The method does not function without a specific homogenizing step which renders it expensive.

The patent specification EP 0 737 654 A1 relates to a synthetic quartz glass with a content of molecular hydrogen of at least $10^{18}$ molecules/cm$^3$ and a low OH content of a maximum of 50 ppm, which at a temperature of maximally 500° C. and under a high pressure is enriched with $H_2$. The stability is specified with $1.3 \cdot 10^7$ laser shots at an energy density of 350 mJ/cm$^2$, a shot frequency of 400 Hz and a wavelength of 248 nm, Also in this case, a subsequent treatment of the quartz glass is required, to which end a chlorine free raw material can be used.

In U.S. Pat. No. 5,364,433 a synthetic quartz glass suited for production of DUV-stepper lenses and a method for producing the same is disclosed. The quartz glass exhibits an OH content of 10–100 ppm, a chlorine content of maximally 200 ppm, a molecular hydrogen content of $<10^{16}$ molecules/cm$^3$, a refractive index homogeneity of $>5 \cdot 10^{-6}$ and a strain of $>5$ nm/cm. The stability of this quartz glass against excimer laser irradiation at a low absorption is only disclosed up to a low 10 shot rate of $0.8 \cdot 10^6$ (energy density 200 mJ/cm$^2$, shot frequency 100 Hz, $\lambda$=193 nm). The comparatively low stability is explained in that a dehydration step provided for in the manufacturing process leads to an increase of the Cl content which, in turn, reduces the DUV stability. An additionally provided homogenizing step renders the method more expensive.

A substrate plate for photomasks which shows a $H_2$ content between $10^{17}$ and $10^{19}$ molecules/cm$^3$ is disclosed in EP 0 636 586 A1. This solution is little or not at all suited for the production of imaging optical members in the DUV range, which are subject to considerably higher requirements with regard to the transmission and the optical homogeneity than photomasks.

U.S. Pat. No. 5,086,352 discloses optical components made of synthetic quartz glass which can be employed in DUV excimer laser irradiation and a method for producing the same. The optical components exhibit an OH concentration of at least 100 ppm and a doped hydrogen concentration of at least $5 \cdot 10^{16}$ molecules/cm$^3$ (and an amount of $1 \cdot 10^{20}$ molecules/cm$^3$ released at degassing, respectively,) and are free from stratification in at least one direction. 50 ppb are given for the chemical purity of the component in the most pretentious case for Na, K and LI, and 10 ppb for Mg, Ca, Ti, Cr, Fe, Ni, and Cu. The preforms of the optical components are characterized in that there is no stratification parallel to the incident light, that the OH concentration rises from a central minimum to a maximum without a point of inflection, that in the range between minimum and maximum the refractive index inhomogeneity is $2 \cdot 10^{-6}$ or lower, and in that there exists a hydrogen doping. Such a preform shows profiles of the OH concentration, of the Cl concentration and of a fictitious temperature which are to be adjusted for obtaining a high refractive index of homogeneity. The method for producing the optical components comprises, in each case, steps for removing stratifications and for doping with hydrogen which renders the entire production process complicated and expensive. Moreover, the stability is only given up to a comparatively low laser shot rate of $10^7$ (energy densities: 400 and 100 mJ/cm$^2$, respectively, shot frequencies: 100 Hz, λ: 248 and 193 nm, respectively,).

U.S. Pat. No. 5,325,230 is based on U.S. Pat. No. 5,086,352 and additionally requires for the optical component of synthetic quartz glass an absence of oxygen defects and a strain birefringence, which has to be <5 nm/cm. The OH concentration distribution is axially symmetrical. Also in this case, stratifications have to be removed and doping with hydrogen has to be carried out in the course of manufacturing the optical components. Considerable and expensive efforts have to be made to obtain a high purity of the quartz glass, which also finds expression in that special measures have to be taken for storing the basic materials.

In the EP 0 747 327 A1 reference, a method for the heat treatment and consolidation of a quartz glass preform is described whereby a reduction of the laser induced defects in the quartz glass is asserted to be obtained. There is nothing reported of the refractive index homogeneity, of the form and mass of the bodies to be produced, of a feasible application of the produced quartz glass under extreme conditions. The represented increases in absorption at 248 nm and 193 nm, respectively, are only acceptable up to few million shots.

EP 0 622 340 A1 discloses an improved method for producing a body of synthetic silica glass. A burner comprising at least five nozzles is supplied with fuel gas in such a manner that the produced synthetic silica glass shows an OH content optimized compared to the $H_2$ content. There is nothing reported with respect to the DUV stability and the refractive index homogeneity. For obtaining OH contents above 1150 ppm, this procedure is unstable with respect to the attainable growth behavior.

In EP 0720 969 A1, a quartz glass, an optical component containing this quartz glass and a manufacturing process for the quartz glass are described. For the production of the preforms a downward directed burner. is employed. The stability of the quartz glass with respect to the excimer laser irradiation lies at a comparatively low shot rate of about $10^6$. A Cl content of 10 ppm is achieved by an extremely low uneconomical raw material feed of 70 g/min·cm$^2$ via the central nozzle of the burner. The OH concentration of the quartz glass substantially lies at only 900 ppm.

In EP 0 720 970 A1 there is described a quartz glass for photolithographic applications, an optical component containing said quartz glass, a photolithographic device containing said component, and a method for producing the quartz glass. There are conditions disclosed for producing a preform which can also be utilized in the DUV. However, the stability of the quartz glass against excimer laser irradiation is only represented up to $10^6$ shots. The quartz glass is subjected to an F-doping which ensures, as known, low dispersion losses and has a favorable effect on the DUV stability. However, a high optical homogeneity of the melted quartz glass will not. be attainable owing to the F-doping. In the course of $SiO_2$ deposit on places with the highest temperature, there also develop the highest OH concentration and the highest F concentration. Hence, an error is introduced which increases the gradient of the refractive index curve.

Finally, EP 0 735 006 describes a method for producing quartz glass in which the growth process of the quartz glass produced synthetically takes place in an upright direction. The process is controlled in such a manner that the stratification is adapted to take place only vertically to the growth direction of the preform.

SUMMARY OF THE INVENTION

By virtue of the present invention the disadvantages of the prior synthetic quartz glasses are obviated which, up to now, did not permit the utilization of the same in extreme applications in the DUV. Therefore, it is an object of the present invention to produce, under use of a flame hydrolysis technique, a synthetic quartz glass which meets highest requirements concerning stability with respect to excimer laser irradiation in the DUV at a high energy density and concerning optical homogeneity. It is a further object of present invention to provide a device which is particularly suited in the manufacture of the quartz glass and which renders the output of the manufacturing process maximal.

According to the present invention, the objects are realized by the characteristic features described herein. It is also feasible to employ radiation of other wavelengths, provided that the same lies under 250 nm. The excitation conditions can be varied; for example, a transmission reduction of ΔT<0.05%, is obtained at a laser shot frequency (frequency) of >400 Hz, a laser shot rate (shot number) of >$10^8$, and an energy density <25 mJ/cm$^2$ with respect to the wavelength $\lambda_1$=248 nm. The transmission reduction corresponds to damage behavior for values stated herein. Hence, it lies within the scope of the invention. It can be generally stated that a varied reduction of the internal transmission takes place at a radiation variation, but an unchanged damage behavior. Damage behavior is to be understood by someone skilled in the art as a long-term damage, for example, a transmission variation of synthetic quartz glass under the effect of an excimer laser irradiation.

A core area of the preform extends over at least 50 to 90% of the preform diameter, which can amount to up to 18 cm and more. It shows neither an axial stratification nor a stratification at right angles to its direction of growth; its entire volume is free from stratifications. The growth range of the drum-shaped preform has an at least almost flat part close to the center, which substantially conforms to the core, and a peripheral part with a parabolic face which passes over into a cylindrical surface of the drum-shaped preform. The cross-sectional area of the preform which can be utilized for different purposes and in which the quality of the synthetic quartz meets the respective requirements is different. Thus, for example, it is sufficient when used in illumination systems for excimer laser, that the synthetic quartz glass has high stability and transmission at an adequate homogeneity. In this case, 70% to 90% of the inner cross-section of the preform can be utilized. When projection elements for directing high-energy laser irradiation are made from the preform, then under the same conditions a limitation to the inner 50 to 70% of the cross-section of the preform is necessary. Thereby, it is essential that across the inner cross-section of the preform not only high stability and transmission exist, but also high homogeneity; this means, however, that the OH content of the preform is constant to ±10 ppm over this inner cross-section. Advantageously, the OH content of the core area of the preform amounts to at least 1250 ppm at a tolerance of ±10 ppm. The Cl content of the same does not exceed 20 ppm and preferably is 5 to 15 ppm. The $H_2$ content of the core area of the preform advantageously amount to >1·$10^{18}$ or molecules/cm$^3$. A preform having the abovementioned parameters is, to a high degree, stable against high energy DUV irradiation, shows a high refractive index stability and is excellent for the production of optical members such as DUV stepper-lenses, directing members for laser beams, photomasks etc. At least over a part of the core area, the preform advantageously exhibits a refractive index homogeneity of $<0.5 \cdot 10^{-6}$. Thereby, traces of contaminating elements (e.g. Cr, Co, Fe, Ni, Cu, V, Zn, Al, Li, K, Na) can be contained in the preform up to 500 ppb. The preform does not require any additional doping with $H_2$, F and others, to render it serviceable for tasks in DUV excimer laser irradiation. Also a subsequent treatment of the synthetic quartz glass in a reducing atmosphere is not required. If necessary, it is advantageous to cut optical members out of the material of the core area.

A device for producing the preform comprises a substantially horizontal muffle with two differently sized arranged openings opposing each other, the larger of which is adapted for inserting the preform and the smaller one for inserting a burner, and an internal chamber which narrows from the larger opening to the smaller opening. The burner is provided with nozzles which are coaxially arranged to each other and to the burner axis, the centrally arranged nozzle discharges the basic material, for example, $SiCl_4$ and $O_2$ and the external nozzles the fuel gas, for example, $H_2$ and $O_2$, parallel to one another and to the burner axis. The narrowing substantially is a gradual one. Unlike similar prior devices, the muffle has neither an opening nor a bulge on its top-side. The overall length of the muffle is at least twice the size of the diameter of the vitreous preform. The almost planar leading face of the latter is preferably arranged in the center of the internal chamber: of the muffle. The muffle is preferably embodied in three layers in order to ensure a sufficient and constant internal temperature as well as a low heat emission. It is advantageous, when the distance of the substantially rotation-symmetrical preform surface relative to the internal limiting face is 5 to 100 mm depending on the flow conditions for the waste gas. Furthermore, it is advantageous, when the distance of the burner to the preform is 135 to 350 mm in dependence on the geometry of the burner nozzles and the flow of the fuel gases volume. As to the smaller opening, in which the burner is arranged for free movement, a diameter of 50 to 100 mm is to be recommended.

Due to the internal geometry of the muffle and the operation of the burner, the device of the present invention ensures that the preform is definedly distributed by the fuel gas as well as that preforms of principally optional lengths can be the melted on. No subsequent treatment (twisting, doping) is required for the preform. A modification of geometry in order to adapt the preform to the intended application can be combined with a heating of the preform. In spite of extreme process control the device permits melting preform masses of 50 kg and more, in a normal melting process, which are optically homogeneous and stable in the DUV against high-energy laser beams.

BRIEF DESCRIPTION OF THE DRAWINGS

The invention will be explained hereinafter in more detail by virtue of the schematic drawings. There is shown in.

DETAILED DESCRIPTION

Figure 1:
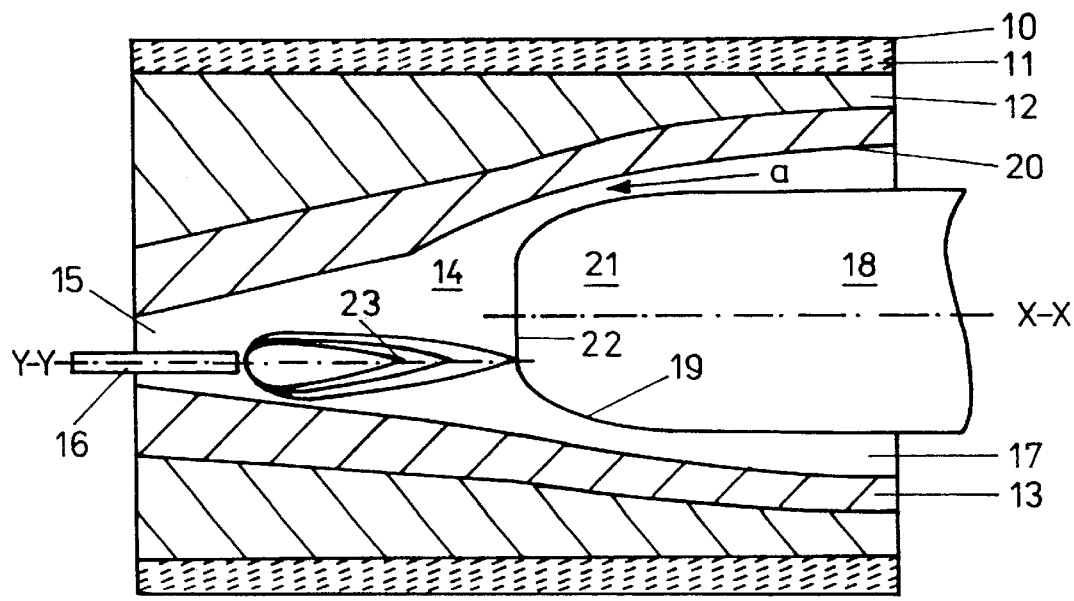
FIG. 1 a device for melting on a preform.

In FIG. 1, a horizontally arranged muffle 10, which effects low heat losses caused by radiation, is represented by three shells 11, 12, 13, wherein the shell 11 is a high porosity insulating material, for example, a ceramic fiber material, shell 12 is a fire-resisting concrete or chamotte, and shell 13 is a high temperature resistant material, for example, $Al_2O_3$ or SiC. The muffle 10 has an internal chamber 14 with a smaller opening 15 for inserting a burner 16 and a larger opening 17 via which a preform 18 to be melted on protrudes into the muffle 10, the geometrical axis of said preform coincides with an axis of rotation X—X. At least a portion of the muffle 10 which envelopes the preform 18 is at least approximately symmetrical about the axis X—X, too. There is a space a between a parabolic face 19 of the preform 18 and a limiting surface 20 of the internal chamber 14. The space a advantageously is not larger than 50 mm and not smaller than 15 mm in order to eliminate deposits on the limiting surface 20 by the material to be melted. In the internal chamber 14, the preform 18 is provided with a cap 21 having a substantially planar leading face of which a plateau 22 lies in the center of the muffle 10 and is at right angles to the axis X—X. The parabolic lateral face 19 of the preform 18 is a side of the cap 21. Via the opening 15, which in the present embodiment has a diameter of 60 mm, the burner 16 is inserted into that portion of the muffle 10 which deviates from the axial symmetry, in such a manner that its axis Y—Y is slightly inclined relative to the axis of rotation X—X and intersects the plateau 22 below the intersection point of the axis of rotation X—X and the plateau 22. The burner 16 is provided with a plurality of nozzles, not shown in detail, which are in parallel to each other. A centrally arranged nozzle discharges 410 g/min·cm$^2$ $SiCl_4$ and nozzles arranged peripherally to the former, discharge 14.5 m$^3$/h $O_2$ as well as 7 m$^3$/h $O_2$ so that a growth rate of 8 mm/h results. The burner 16 is adjustable within the opening 15. The torch 23 of the burner 16 is directed towards the plateau 22.

In a method for producing the preform 18 from synthetic quartz glass, which principally is taught, for example, in DE 42 03 287 C2, $SiO_2$ particles are formed from $SiCl_4$ by means of an $H_2/O_2$ flame and immediately vitreously melted on at temperatures of over 2000° C. to yield the drum-shaped, glassy preform 18. The preform 18 has an axially symmetrical refractive index profile. The preform 18 is taken from the arrangement after completion of the melting process and is subjected to a conventional cooling process in order to reduce internal strains to <5 nm/cm strain birefringence. The preform 18 does not show any stratifications. By virtue of the arrangement described hereinbefore, the drum-shaped preform 18 is produced, the synthetic quartz glass of which exhibits the abovementioned parameters concerning the OH content and the Cl content, as well as the internal transmission and the outstanding low decrease of transmission under the specified radiation conditions as well as a high optical homogeneity. They are specified in the following figures.

Figure 2:
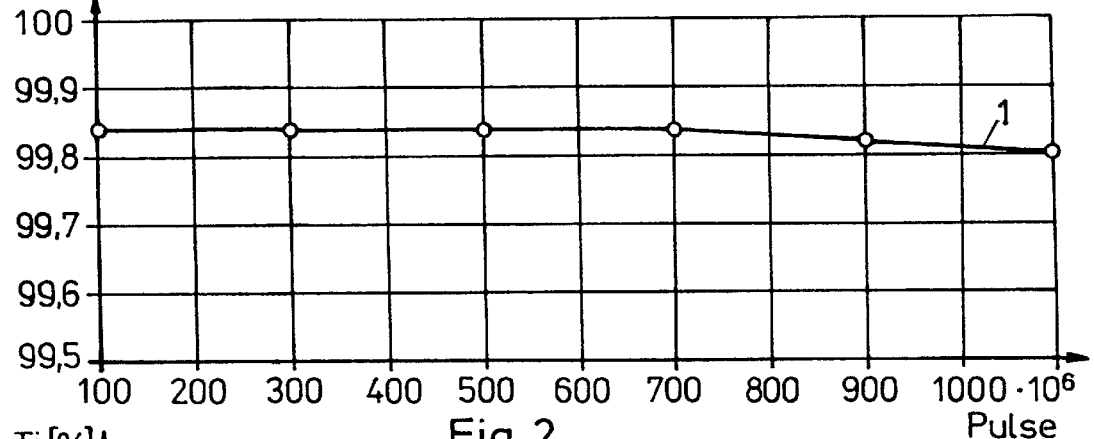
FIG. 2 a diagram in which internal transmission of a quartz glass block, cut out of a preform, is plotted as a function of laser pulse rate at a wavelength of $\lambda_1=248$ mn, FIG. 3 a diagram corresponding to that of FIG. 2 for $\lambda_2=193$ nm, FIG. 4 a top view of a preform, and FIGS 5a–5d four graphs obtained from a laser induced fluorescence (LIF) at a transmission with laser light of the wavelengths $\lambda_1=248$ nm and $\lambda_2=193$ nm, from the OH content and the strain-induced birefringence.

In the Cartesian coordinate system of FIG. 2 laser pulse numbers 100 up to 1100, multiplied by 10$^6$ are plotted along the x-coordinate and the internal transmission in % is plotted along the y-coordinate at a thickness of the glass layer of 10 mm. A curve 1 represents the internal transmission $T_i$ for laser light of the wavelength 248 nm for the quartz glass; which is very high at 99.84% and is constant up to $700 \cdot 10^6$ laser pulses. Only then it slightly slopes, namely by 0.02%, up to $1100 \cdot 10^6$ laser pulses. Accordingly, the decrease in transmission $\Delta T$ lies at $900 \cdot 10^6$ laser pulses far below the value of 0.1% mentioned above. The further conditions are: laser frequency=300 Hz, energy density=10 mJ/cm².

Figure 3:
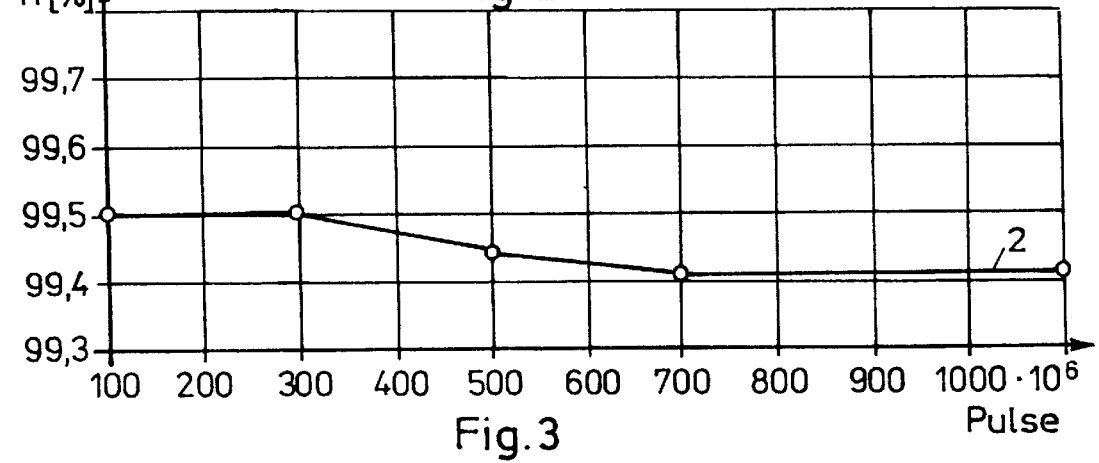

As to the Cartesian coordinate system of FIG. 3 the same measures are valid as in FIG. 2. The quartz glass of 10 mm thickness is exposed to a laser irradiation of the following conditions: $\lambda_2$=193 nm, laser frequency=300 Hz, energy density=1.5 mJ/cm². Curve 2 represents the internal transmission of the quartz glass, which is constant up to $300 \cdot 10^6$ laser pulses, and which decreases by 0.05% between $300 \cdot 10^6$ and $500 \cdot 10^6$ laser pulses, and between $500 \cdot 10^6$ laser pulses and $700 \cdot 10^6$ laser pulses by 0.04%, and then remains constant up to $1100 \cdot 10^6$ laser pulses. Also in this case, the condition for the transmission decrease $\Delta T$<0.1 %/cm is maintained.

Figure 4:
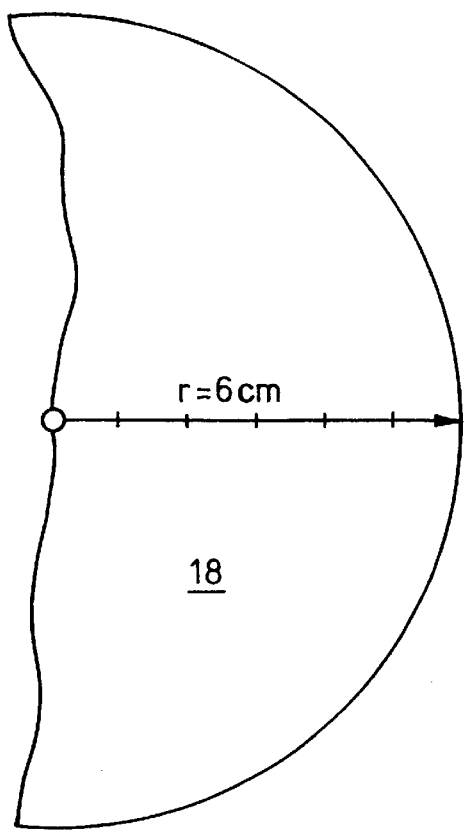
Figure 5:
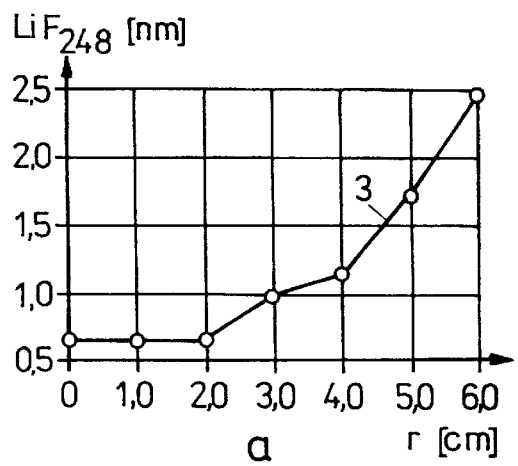
Figure 5:
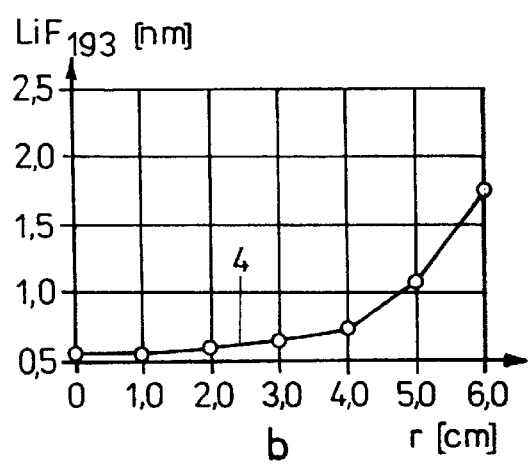
Figure 5:
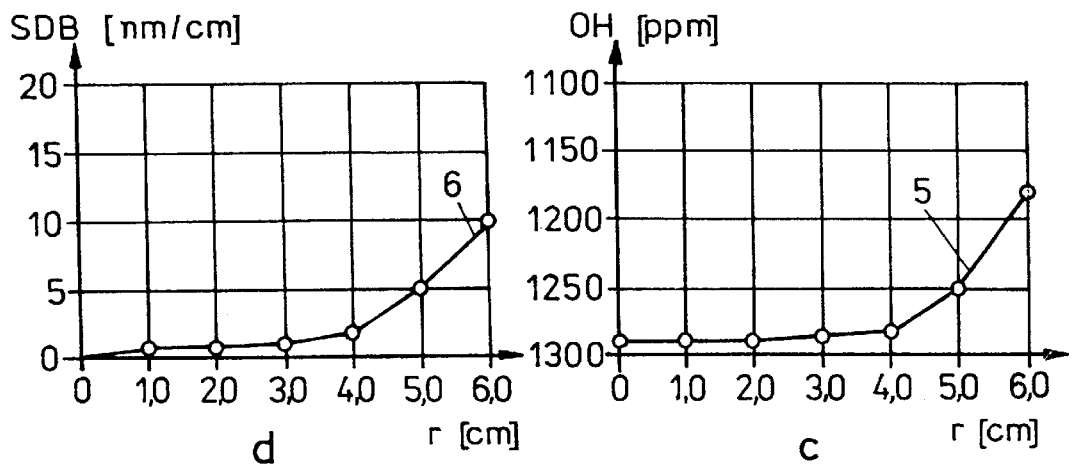

In FIG. 4 a section of a plan view of a preform 18 is represented with a radius r=6 cm. The radius vector r is the x-coordinate in the following FIG. 5. Thereby, the excitation conditions for the laser irradiation as mentioned in FIG. 2 and 3 are also valid.

In FIG. 5a the LIF values for the wavelength $\lambda_1$, are plotted in a curve 3 as a function of the radius by centimeters. In order to determine the LIF values, results of research for determining the parameters effecting the long-term stability of optical components under the effect of laser radiation, as published in W. Triebel et al. in the Journal Technisches Messen, vol. 63 (1996), number 7/8, pp. 291–295 have been utilized. The state of an unchanged luminescence was obtained after 2000 laser shots, in measuring an unchanged luminescence at a wavelength of 650 nm. The LIF values of 0.7 to 2.5 determined via the radius lie at about 1/10 of the LIF values of the relevant products of the prior art. The same is valid for the LIF values of the wavelength $\lambda_2$, which in FIG. 5b are plotted in a curve 6, centimeter by centimeter of the radius and, from the center up to the edge of the preform 18, range from 0.55 to 1.8.

In FIG. 5c the OH content detected via the radius is plotted centimeter by centimeter in a curve 4. Thereby it becomes obvious that the OH content in a core area of 4 cm exceeds by far a minimum value of 1150 ppm and that the minimum value, even at the periphery of the preform 18, is set at 1180 ppm.

In FIG. 5d the values of the strain-induced birefringence (SDB) measured as a function of the radius are plotted in a curve 5. There it becomes obvious that the values, at least in the core area up to 4 cm, fall far below the limiting value of 5 nm/cm layer thickness for the strain-induced birefringence and that in the edge portion (r=5 to 6 cm) of the preform 18 this limiting value is at least almost maintained.

All features disclosed in the specification and in the drawings are substantial for the invention both, individually and in any combination with one another.

What is claimed is:

1. A synthetic quartz glass preform for application of high-energy DUV radiation having a wavelength of less than 250 nm, comprising:

a core area having an OH content of $\geq$1150 ppm, a strain birefringence of $\leq$5 nm/cm, an $H_2$ content of $\geq 1 \cdot 10^{18}$ molecules/cm³, a Cl content of $\leq$20 ppm, and a total concentration of elements Cr, Cb, Fe, Ni, Cu, V, Zn, Al, Li, K, Na of 500 ppb or less;

said core area being substantially free of stratifications;

said core area having a stability with respect to high-energy DUV radiation that is defined by a transmission reduction of $\Delta T \leq 0.1$%/cm thickness, when the synthetic quartz glass preform is subjected to radiation at a wavelength $\lambda_1$=248 nm, a laser shot frequency $\geq$300 Hz, a laser shot number $\geq 10^9$, and an energy density $\leq$10 mJ/cm², and when the synthetic quartz glass preform is subjected to radiation at a wavelength $\lambda_1$=193 nm, a laser shot frequency $\geq$300 Hz, a laser shot number $\geq 2 \; 10^9$, and an energy density $\leq$5 mJ/cm²; and said preform being produced by a method comprising the steps of:

applying a flame combusting a fuel comprising H and O to a Si compound to form the preform without doping with F, and cooling the preform.

2. The preform as claimed in claim 1, wherein at a radiation wavelength variation applied to the preform a varied transmission reduction through the preform takes place and said preform also has unchanged luminescence.

3. The preform as claimed in claim 2, wherein said preform has a preform diameter and the core area has a core area diameter, said core area diameter being at least 50% of the preform diameter.

4. The preform as claimed in claim 3, wherein the OH content of the core area is $\geq$1250 ppm.

5. The preform as claimed in claim 1 or 4, wherein the OH content of the core area is uniform at a tolerance of ±10 ppm.

6. The preform as claimed in any of claims 1, 2, 3 or wherein at least a portion of the core area exhibits a refractive index homogeneity of >$0.5 \cdot 10^{-6}$.

* * * * *